United States Patent [19]

Davis

[11] 4,042,934
[45] Aug. 16, 1977

[54] DOPPLER RADAR MODULE EMPLOYING COUPLED RECTANGULAR WAVEGUIDES

[75] Inventor: John W. Davis, San Diego, Calif.
[73] Assignee: Radar Control Systems Corporation, San Diego, Calif.
[21] Appl. No.: 584,109
[22] Filed: June 5, 1975
[51] Int. Cl.² .................. G01S 9/42; H01Q 13/06
[52] U.S. Cl. .................. 343/786; 343/5 PD; 333/10
[58] Field of Search ............ 343/5 PD, 702, 703, 343/786; 333/9, 10; 340/258 A, 258 B

[56] References Cited

U.S. PATENT DOCUMENTS

| | | | |
|---|---|---|---|
| 3,434,147 | 3/1969 | Cabion et al. | 343/786 |
| 3,747,109 | 7/1973 | Corbell et al. | 343/779 |
| 3,805,262 | 4/1974 | Klein et al. | 343/8 |
| 3,806,942 | 4/1974 | Preti | 343/702 |

Primary Examiner—Eli Lieberman
Attorney, Agent, or Firm—Frank D. Gilliam

[57] ABSTRACT

A doppler radar module consisting of transmitting and receiving diodes disposed within adjacent sections of wave guide with the transmitter diode disposed a half wave length away from a shorting end of the transmitter section of wave guide, and a receiver diode disposed a quarter wave from a shorting end of the receiver portion of the guide. The receiver section and the transmitter section of the wave guides being separated by a common wall; coupling aperture disposed in the common wall substantially one wave length from the end of the transmitter section of wave guide for coupling a small portion of transmitter energy into the receiver portion of wave guide and for coupling substantially all reflected energy into the wave guide section.

7 Claims, 9 Drawing Figures

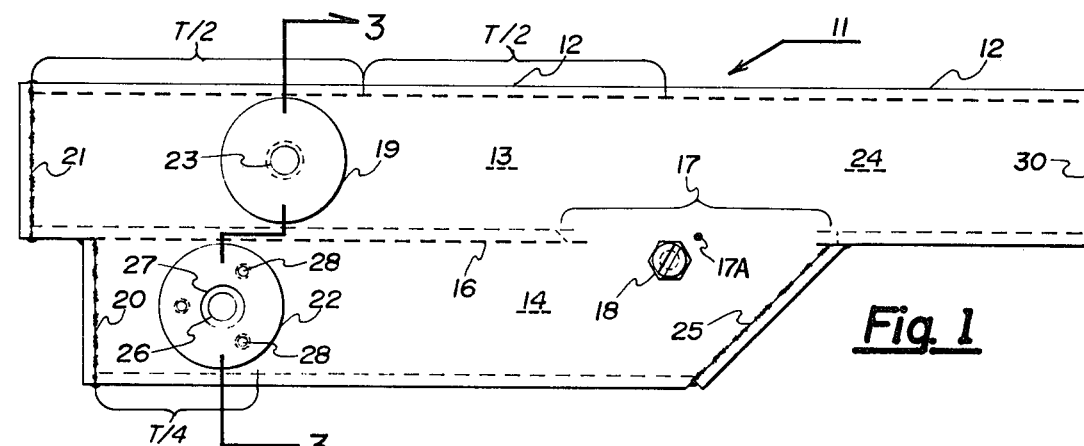
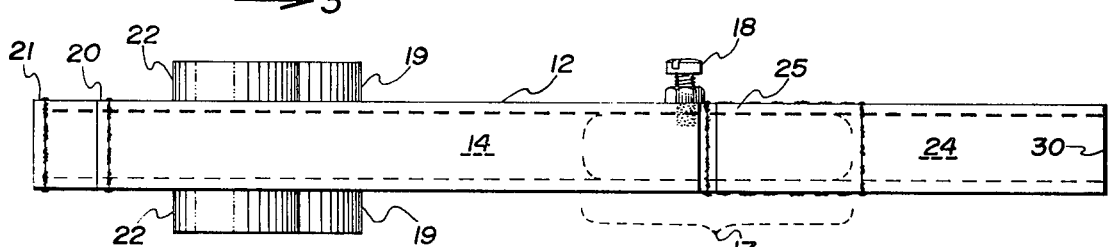
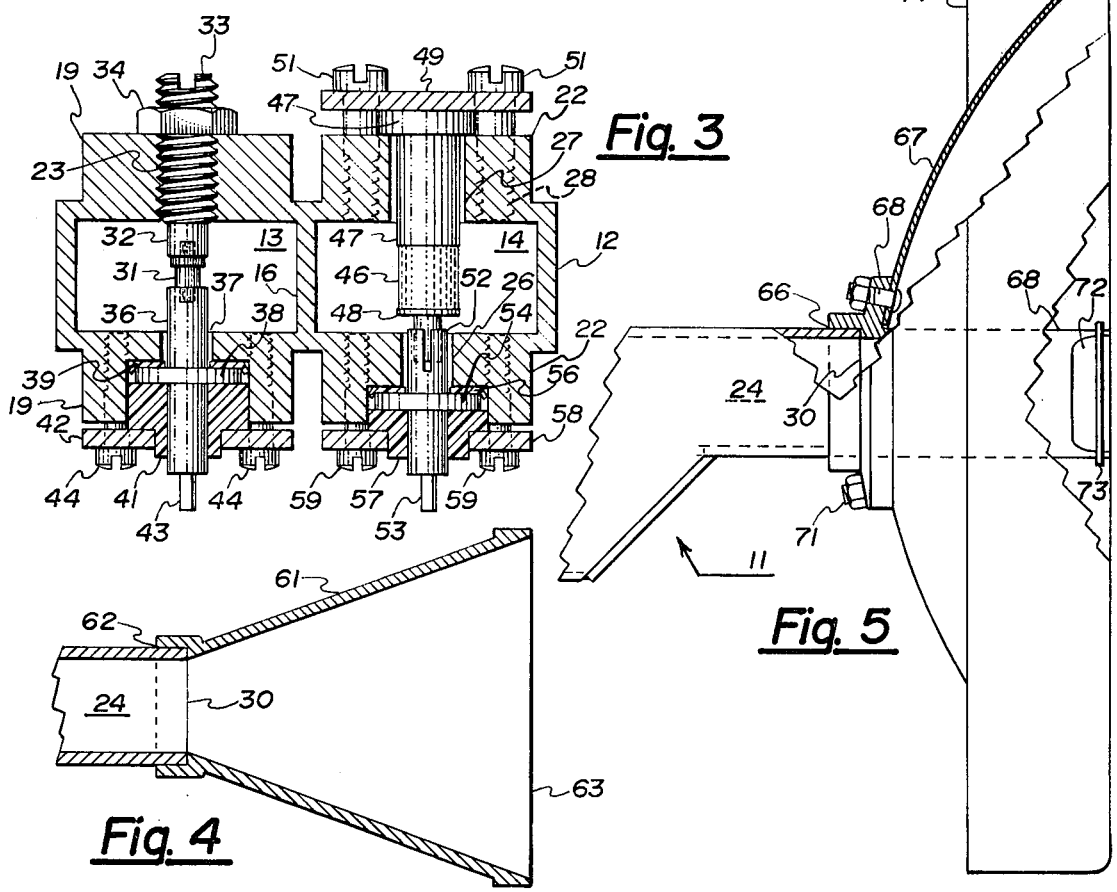

DOPPLER RADAR MODULE EMPLOYING COUPLED RECTANGULAR WAVEGUIDES

BRIEF DESCRIPTION OF THE INVENTION

The present invention relates to a doppler radar module and more particularly to a doppler radar module in which a transmitter diode and a receiver diode are disposed in adjacent sections of wave guide with aperture coupling therebetween.

According to the invention, a doppler radar module is provided in which transmit and receive wave guide sections are divided by a common dividing wall with a diode transmitter disposed within the transmit section and a diode receiver disposed with the receiver section. The transmitter diode is disposed an even number of quarter wave lengths of the transmission frequency from shorting end of the transmit wave guide section and the receiver diode an odd number of quarter wave lengths from a shorting end of the receive wave guide section. A coupling aperture is disposed in the dividing wall an even number of quarter wave lengths of the transmitting frequency from the back shorting wall of the transmission section of wave guide thereby presenting a voltage short at the aperture. Reflected energy will thereby be directed through the aperture to the receiver section of wave guide, the aperture being approximately an odd number of quarter wave lengths of the transmission frequency from the back wall of the receive section presenting a low impedence entrance to the receiver section. Typically, the transmit diode is disposed a half wave length from the shorting end wall of the transmit section of the wave guide and a half wave length from the aperture, and the receiver diode is disposed a quarter wave length from the shorting end wall of the receiver section of the wave guide. A tuning screw can be inserted in the wave guide in the vicinity of the aperture for fine tuning the aperture coupling. Hence, a small amount of transmitted energy is coupled into the receiving diode which acts as a local oscillator for a homodyne action with reflected energy into the receive section of the wave guide. The output of the wave guide can be split or common as dictated by the applications of the system.

An object of the present invention is the provision of a compact doppler radar module.

Another object of the invention is the provision of a compact radar module with adjacent transmitter and receiver sections.

A further object of the invention is the provision of a doppler radar module having a simplified wave guide transmission system.

Yet another object of the invention is the provision of a doppler radar module which is inexpensive to manufacture and assemble and convenient in operation.

Other objects and many of the attendant advantages of the present invention will be readily appreciated when considered in connection with the accompanying drawings in which like reference numerals designate like parts throughout the Figures thereof and Wherein:

FIG. 1 is a top view of a preferred embodiment of the present invention;

FIG. 2 is a side elevational view of the embodiment of FIG. 1;

FIG. 3 is a sectional view taken along lines 3 — 3 of FIG. 1 illustrating the transmit and receive components of the embodiment of FIG. 1;

FIG. 4 is a cross sectional view of a horn radiator utilized in conjunction with the embodiment of FIG. 1;

FIG. 5 is a side elevational view, partially sectioned, of a dish type radiator utilized with the embodiment of FIG. 1;

DETAILED DESCRIPTION OF THE DRAWING

Figure 6:
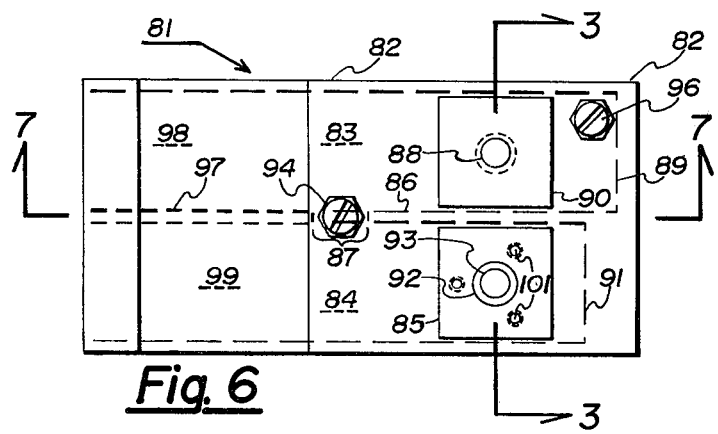
FIG. 6 is a top view of a modification of the embodiment of FIG. 1.

Referring to FIGS. 1 and 2, a transmit-receive module is shown generally at 11 having a basic casting 12 with a transmitter wave guide section 13 and a receiver wave guide section 14 with a common dividing wall 16 therebetween. A coupling aperture 17 is disposed in common wall 16 and has an adjusting screw 18 in immediate proximity thereto. Transmitter mounting boss 19 is disposed within transmitter wave guide section 13 approximately one half wave length from a transmitter back plate shorting surface 21 in transmit wave guide section 13. Receiver mounting boss 22 is disposed within receiver wave guide section 14 approximately one quarter wave length away from receiver back plate shorting surface 20. Transmitter mounting boss 19 has a threaded bore 23 therein for receiving the transmitter diode assembly as will be discussed with reference to FIG. 3. Center point 17A of aperture 17 is located approximately one half wave length from transmitter mounting boss mounting bore 23. A common wave guide section 24 is disposed after coupling aperture 17. Receiver mounting boss 22 has a lower bore 26 and an upper bore 27 therein. Mounting holes 28 are disposed within receiver mounting boss 22. Wave guide section 25 consists of a 45° short for optimizing transmission characteristics. Common wave guide section 24 terminates at a port 30.

Referring to FIG. 3, transmitter diode 31 is carried by upper diode mount 32 which terminates in an upper diode clamp screw 33 threadably engaged with threaded bore 23. Upper diode clamp screw 33 is threadably engaged with lock nut 34 which is in contact with a top surface of transmitter mounting boss 19. Transmitter diode 31 is also carried by a lower diode mount 36 disposed within lower mount aperture 37 and carried by bypass disc 38. Transmitter bypass dielectric 39 is disposed between radio frequency bypass disc 38 and a portion of transmitter mounting boss 19. Insulating clasp 41 is disposed between mount bypass disc 38 and transmitter clamp plate 42. Transmitter external contact 43 extends from lower diode amount 36. Transmitter clamp screws 44 are in threadable engagement with mounting bores in transmitter mounting boss 19 and transmitter clamp plate 42 to transmitter insulating clamp 41 clamping the transmitter assembly together. The inner walls of transmitter mounting boss 19 defines a portion of transmission wave guide section 13.

Receiver diode window 46 is disposed between upper receiver contact 47 and lower receiver contact 48. Upper receiver contact 48 is clamped by upper receiver clamp plate 49, which is held in place via clamp screws 51. Receiver diode window 46 is disposed within a portion of receiver wave guide section 14 which is defined by the inner surfaces of receiver mounting boss 22. Upper receiver contact 47 is received within upper bore 27 and lower receiver contact 48 is coupled through coupling sleeve 52 to external contact 53 through receiver radio frequency bypass disc 54. Dielectric 56 is disposed between receiver radio frequency bypass disc 54 and receiver mounting boss 22. Insulating clamp 57 is disposed between coupling sleeve 52 and mounting boss 22 and carries coupling sleeve 52 and mounting boss 22 and carries coupling sleeve 52 in the central aperture therein. Insulating clamp 57 is clamped via clamp plate 58 and clamp screws 59 which are in threadable engagement with receiver mounting boss 22.

Referring to FIG. 4, coupling port 30 of wave guide section 24 is coupled to antenna horn 61 via antenna horn port coupling 62. Antenna horn 61 has a terminating aperture 63.

Referring to FIG. 5, a dish adapter port coupling 66 couples dish reflector 67 to wave guide port 30 of wave guide section 24 and carries a dish adapter section 68 with mounting apertures for reflector mounting hardware 71. Primary antenna port 72 is carried by antenna splash plate 73. Dish reflector 67 terminates in a stiffening flange 74 around the periphery thereof.

Figure 7:
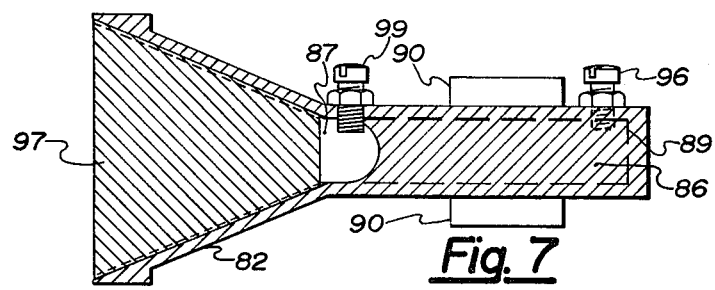
FIG. 7 is a sectional view taken along lines 7 — 7 of FIG. 6.
Figure 8:
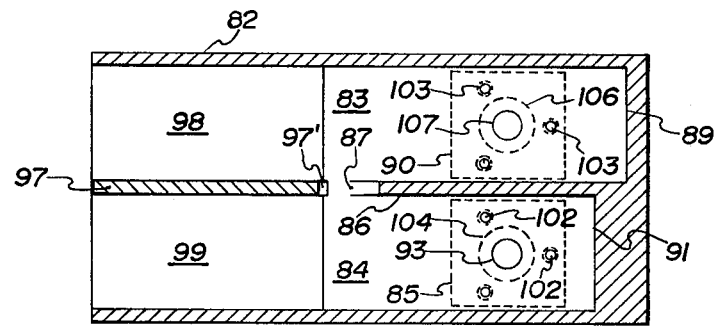
FIG. 8 is a sectional view showing the bottom half of FIG. 6.
Figure 9:
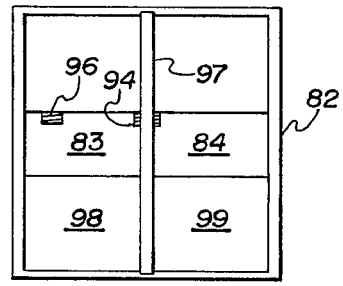
FIG. 9 is a front elevational view of the embodiment of FIG. 6.

Referring to FIGS. 6 and 7, a double section horn module is shown generally at 81 having a wave guide casting 82 with a transmit section 83 and a receive section 84, separated by a common wall 86. Aperture 87 is disposed within wall 86. Transmitter mounting boss 90 is disposed within transmitter wave guide section 83 and has a mounting aperture 86 which is disposed approximately one half wave length of the transmission frequency from end shorting surface 89 and one wave length of the transmission frequency from coupling aperture 87. Receiver boss 85 has an upper mounting port 92 which is disposed substantially one quarter wave length of the transmission frequency from back shorting wall 91. A lower aperture is shown at 93. Aperture coupling adjustment screw 94 is shown disposed within coupling aperture 87. Tuning screw 96 is shown disposed between transmitter boss 90 and back shorting surface 89 within wave guide section 83. Horn septum 97 divides a transmission section 98 communicating with wave guide section 83 and receiving section 99 communicating with receiving wave guide section 84. Mounting holes 101 and 102 and receiver disc cavity 104 are disposed within receiver mounting boss 84. Lower mounting holes 103 and transmitter disc cavity 106 are disposed within transmitter mounting boss 90.

OPERATION

It is pointed out that the cross section shown in FIG. 3 of the transmitter and receiver diodes together with their mounting parts apply equally to FIG. 6, i.e., the mounting hardware is identical except that the bosses in FIG. 6 are shown in a square cross sectional configuration as opposed to the circular cross sectional configuration of FIG. 1. The coupling aperture 87 in the embodiment of FIGS. 6-9 is shown having a different geometry than that of the coupling aperture 17 of the embodiment of FIGS. 1 and 2 due to the different transmission characteristics of a completely split wave guide and horn configuration of the embodiment of FIGS. 6-9. Also, the FIGS. 1, 2, 6, 7, and 8 are illustrated with the transmitter and receiver diodes and their respective mounting parts uninstalled for clarity.

Referring to FIGS. 1 and 2, it can be seen that if a transmitter diode disposed within transmitter boss 19 and wave guide section 13 is excited, it will radiate to the right since one half wave length to the left there is a voltage short. A voltage short then appears to the right one half wave length away. Coupling aperture 17 is geometrically disposed at this point. Hence, a minimum of energy is coupled into the area of the receiving boss 22 with substantially all of the energy coupled to the output port 30 of the common wave guide section 24. The amount of energy that is seen at the receiver then becomes the local oscillator of the radar system. When reflected energy is passed back down the common wave guide section 24 it will see a short looking toward the transmission wave guide section 13 since there is an even number of quarter wave lengths from the shorting end surface 21. Hence, received energy will pass through coupling port 17 into the receiving wave guide section 14. Coupling aperture 17 in this regard has the function of a directional coupler. Adjustment screw 18 adjusts the amplitude of the coupled transmission energy establishing the amplitude level of the local oscillator in the radar system. Referring to FIG. 4, a horn radiator is shown for wide angle radiation and, referring to FIG. 5, a dish reflector is shown for a narrower radiation beam.

Referring to FIGS. 6-9, a completely split transmission line is illustrated which in effect follows the identical theory of the embodiment of FIGS. 1 and 2, and is shown with a radiating horn as part of the main casting. Aperture adjustment is again shown at 94 with coupling tuning accomplished by adjustment screw 96. Here the distance between the receiving diode and the coupling aperture is less critical because of the double horn configuration than it was in the embodiment of FIGS. 1 and 2.

Referring to FIG. 3, mounting of the transmitting diode is accomplished by grounding the upper diode contact within upper diode mount 32 and insulatively passing the lower diode contact to the external contact 43 through conductive sleeve 36 which is held within a mounting aperture 37 by mounting radio frequency bypass disc 38 and insulating clamp 41. It is pointed out that bypass dielectric 39 forms a capacitance to the transmitter mounting boss 19 for matching the input external contact 43 to wave guide section 13.

Receiving diode window 46 is shown disposed within wave guide section 14 with its upper contact 47 grounded through clamp plate 49 and clamp screws 51 to receiver mounting boss 22. The output contact 53 is coupled via coupling sleeve 52 to lower receiver contact 48 and is carried by receiver radio frequency bypass disc 54 clamped between insulating clamp 57 and bypass dielectric 56. Bypass dielectric 56 matches the output impedance of the receiving diode to the output circuitry coupled to external output contact 53.

It should be understood, of course, that the foregoing disclosure relates to only a preferred embodiment of the present invention, and it is intended to cover all changes and modifications of the example of the invention herein chosen, for the purposes of the disclosure, which do not constitute departures from the spirit and scope of the invention.

The invention claimed is:
1. A doppler radar module comprising:
a rectangular transmitting wave guide and a rectangular receiving wave guide in side by side relationship with a common wall therebetween, said transmitting wave guide having a shorted end, transmitter means based from said shorted end and an open end coupled to free space, said receiving wave guide having a shorted end and a receiver means spaced therefrom; and an aperture disposed in said common wall, said aperture operable for coupling a portion of any transmitted energy into said receiving wave guide.

2. The doppler radar module of claim 1 wherein:
said transmitting means being based an even number of approximate quarter wave lengths of transmission frequency from said shorted end of said transmitting wave guide; and
said aperture is disposed an even number of approximate quarter wave lengths of transmission frequency from said shorted end of said transmitting wave guide.

3. The doppler radar module of claim 1 wherein:
said transmitting wave guide and said receiving wave guide merge into a common section at said aperture.

4. The doppler radar module of claim 1 and further comprising:
a radiating horn coupled to said wave guide, said radiating horn having a first divided section coupled to said transmitting wave guide, and a second divided section coupled to said receiving wave guide.

5. The doppler radar module of claim 1 wherein:
said transmitter means is disposed an even number of approximate wave lengths of the transmission frequency from said shorted end of said transmitting wave guide and said receiver means is disposed substantially an old number of approximate quarter wave lengths of said transmission frequency from said shorted end of said receiving wave guide.

6. The doppler radar module of claim 1 and further including:
a tuning means in operable proximity with said aperture, said tuning means operable for adjusting the amplitude of transmitter energy coupled into said receiver section.

7. The doppler radar module of claim 1, wherein:
said receiving wave guide has an open end coupled to free space.

* * * * *